United States Patent
Kamm et al.

(10) Patent No.: US 6,769,713 B2
(45) Date of Patent: Aug. 3, 2004

(54) DEVICE FOR PROTECTING THE KNEES OF VEHICLE OCCUPANTS

(75) Inventors: Martin Kamm, Niefern-Oeschelbronn (DE); Juergen Schnitzer, Gaildorf (DE)

(73) Assignee: Dr. Ing. H.C.F. Porsche AG, Stuttgart (DE)

( * ) Notice: Subject to any disclaimer, the term of this patent is extended or adjusted under 35 U.S.C. 154(b) by 0 days.

(21) Appl. No.: 10/157,982

(22) Filed: May 31, 2002

(65) Prior Publication Data

US 2002/0195802 A1 Dec. 26, 2002

(30) Foreign Application Priority Data

Jun. 1, 2001 (DE) .......................... 101 26 864

(51) Int. Cl.⁷ .......................................... B60R 21/22
(52) U.S. Cl. .................................................. 280/730.1
(58) Field of Search ...................................... 280/730.1

(56) References Cited

U.S. PATENT DOCUMENTS

| | | | | |
|---|---|---|---|---|
| 2,834,606 A | * | 5/1958 | Bertrand .................. | 280/730.1 |
| 3,582,107 A | * | 6/1971 | Goetz et al. ............. | 280/730.1 |
| 3,642,303 A | * | 2/1972 | Irish et al. ............... | 280/730.1 |
| 3,702,706 A | * | 11/1972 | Sobkow .................... | 280/730.1 |
| 3,767,225 A | * | 10/1973 | Mazelsky .................. | 280/729 |
| 3,768,830 A | * | 10/1973 | Hass ........................... | 280/729 |
| 4,948,168 A | * | 8/1990 | Adomeit et al. ............ | 280/732 |
| 5,588,672 A | * | 12/1996 | Karlow et al. ........... | 280/730.2 |
| 5,730,464 A | | 3/1998 | Hill | |
| 5,884,937 A | * | 3/1999 | Yamada .................... | 280/730.2 |
| 6,155,595 A | * | 12/2000 | Schultz ...................... | 280/729 |
| 6,217,059 B1 | * | 4/2001 | Brown et al. ............. | 280/730.2 |
| 6,336,653 B1 | * | 1/2002 | Yaniv et al. .............. | 280/730.1 |
| 2002/0171232 A1 | * | 11/2002 | Abe ........................ | 280/730.1 |

FOREIGN PATENT DOCUMENTS

| | | |
|---|---|---|
| DE | 29807424 | 10/1998 |
| DE | 19701709 | 7/2000 |
| DE | 19946477 | 3/2001 |

\* cited by examiner

*Primary Examiner*—Charles T. Jordan
*Assistant Examiner*—Bret Hayes
(74) *Attorney, Agent, or Firm*—Crowell & Moring LLP

(57) ABSTRACT

A knee protection device for vehicle occupants comprises at least one airbag, which, in the inflated operation position, extends in front of the knees of a vehicle occupant, lies against the knees in the event of a restraint and prevents the knees from shifting forward. A knee-protection device, which functions well, is easily constructed and avoids injury during the inflation of the airbag. The airbag or air cushion comprises at least two transversely extending airbags, which are disposed directly one behind another in the longitudinal direction of the vehicle. Adjoining airbags are coupled to one another on the side, facing the knees, by an approximately tangentially extending outer fabric bridge or by an otherwise disposed fabric bridge.

17 Claims, 4 Drawing Sheets

DEVICE FOR PROTECTING THE KNEES OF VEHICLE OCCUPANTS

This application claims the priority of German Patent Document No. 101 26 864.5, filed Jun. 1, 2001, the disclosure of which is expressly incorporated by reference herein.

BACKGROUND AND SUMMARY OF THE INVENTION

The present invention relates to a device for protecting the knees of vehicle occupants with at least one airbag, which, in the inflated operating position, extends in front of the knees of a vehicle occupant.

Such a knee-protection device is disclosed, for example, in German Patent Document DE 197 01 709 C2. This knee-protection device comprises essentially a transversely extending load distribution plate, an airbag section being provided on either side of this load distribution plate. It is a disadvantage of this version of an airbag that the load distribution plate is accelerated very rapidly by the inflation of the airbag, this rapid acceleration representing an increased risk of injury to the occupant. In addition, the propelling charge must be designed adequately, so that the airbag can unfold rapidly. By these means, the problem of the rapid acceleration of the load distribution plate is increased even further.

It is an object of the present invention to create an improved knee-protection device for vehicle occupants, which functions well and can prevent injuries to the knee of vehicle occupants when the knee-protection device is inflated.

The inventive knee-protection device does not have a load distribution plate and consists only of at least two transversely extending airbags which, in the longitudinal direction of the vehicle, are disposed one directly behind the other, or of at least one air cushion, the airbags being tubular and, on the side facing the knees, being coupled together by at least one fabric bridge. In addition, on the side averted from the knees, the airbags are fixed by shackles to the body of the vehicle. When the pressure increases in the two airbags, they mutually support one another and, due to a structural overlapping of the two tubular sections in the center, they endeavor to move apart from one another. This is prevented, on the one hand, by the fabric bridge and, on the other, by the fixing shackles. With the design of the fabric bridge and the fixing brackets, a positionally stable airbag system is formed, for which the airbags are braced by the housing of the knee-protection device and by the dashboard. The tubular form of the airbag offers the largest surface area for the smallest volume. By these means, a high pressure can be built up very rapidly in the airbags. Due to the absence of the load-distribution plate, the weight of the inventive, well functioning, knee-protection device can be reduced significantly. The two tubular sections and the fabric bridge can be produced in one-piece in a so-called 3-D weaving method, so that there are fewer seams and costs are reduced.

The airbags can be filled individually or jointly. If they are filled jointly, air ducts are provided in the connecting fabric bridge and permit joint filling from one side of the device. If the airbags are filled separately, there is no connection between them and each airbag is filled separately.

The geometric shape of the airbags can be adapted to the conditions in the vehicle body or in the cockpit region. Aside from a tubular form, the airbags can also be elliptical or constructed as so-called cushions. The cushion can also have different chambers, which can be filled individually or jointly. Likewise, the air cushion may have several tubes, which are disposed adjacent to one another and have a mutual depression to one another.

Embodiments of the invention are explained in greater detail below and shown in the drawings.

Other objects, advantages and novel features of the present invention will become apparent from the following detailed description of the invention when considered in conjunction with the accompanying drawings.

DETAILED DESCRIPTION OF THE DRAWINGS

A knee-protection device 2 for vehicle occupants 3, which is formed by a pre-fabricated, operational module 4, is disposed within the dashboard 1 in front of the driver seat and/or the passenger seat.

Figure 1:
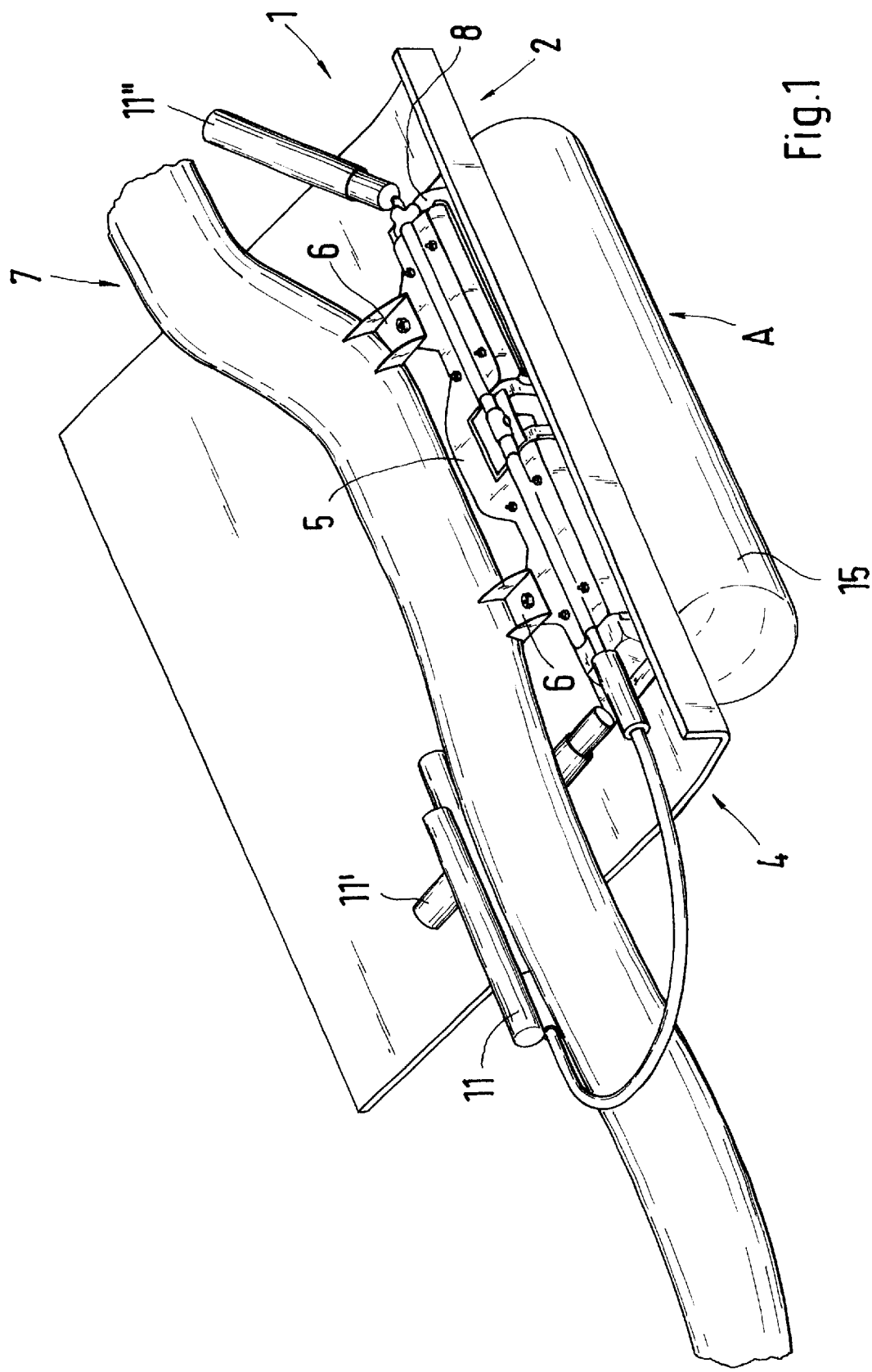
FIG. 1 shows a plan view of a knee-protection device for vehicle occupants, the airbag being shown in the inflated operating position.
Figure 2:
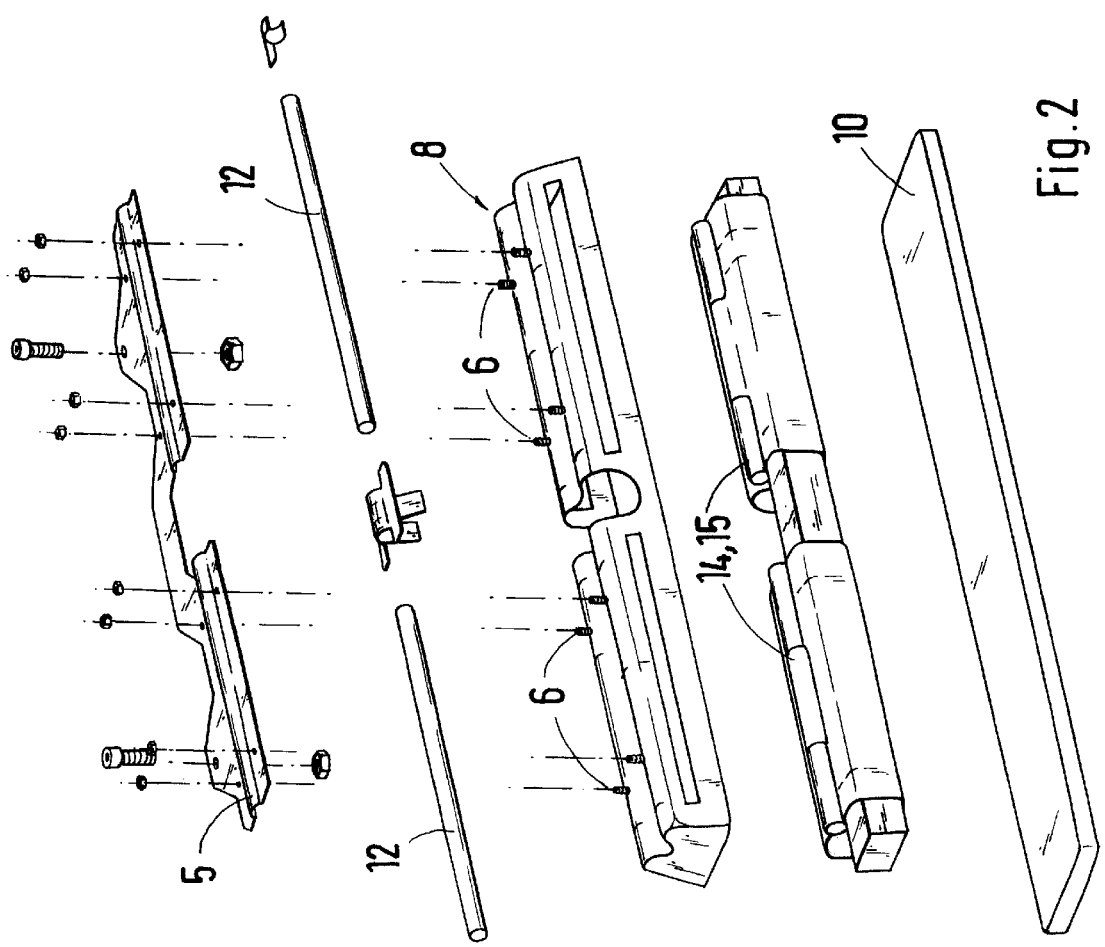
FIG. 2 shows individual parts of the knee-protection device in an exploded representation, the airbag being in its folded-together, starting position.
Figure 2:
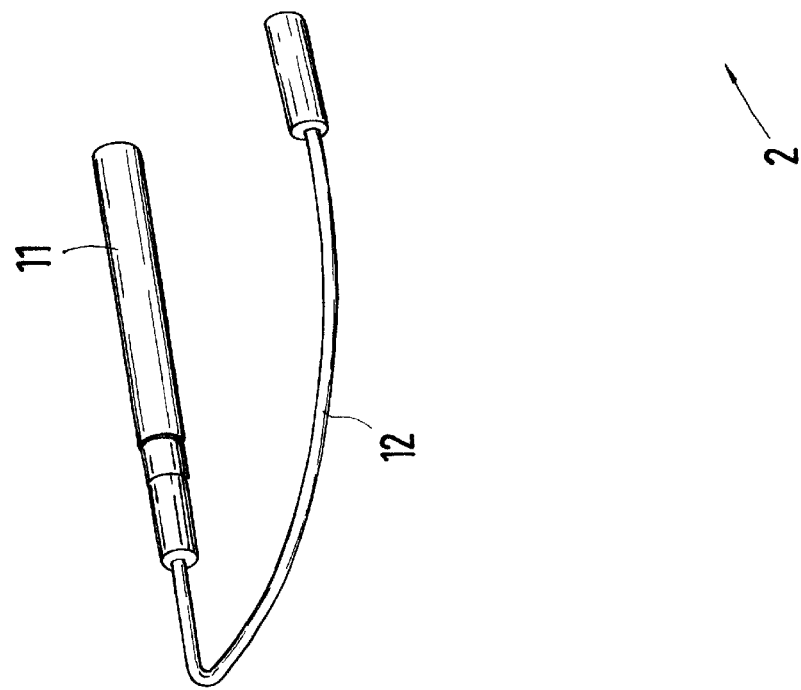

The module 4, disposed on the passenger side, is shown by way of example in FIG. 1. Through the agency of a sheet-metal holding plate 5, it is connected with spaced-apart holding devices 6 of a transverse beam 7 of the dashboard by means, for example, of screwed connections. Each module 4 may comprise an extended, trough-shaped housing 8, one or more folded-together airbags 14, 15, airbag cover 10, gas generator 11 and gas-carrying pipes 12.

In the starting position, the details on which are not shown, all components of the module 4 are covered within the dashboard 1. For example, in the case of a defined deceleration of the vehicle, the airbags 14, 15 are inflated by the gas generator 11 and emerge downward from the dashboard 1. Three different possibilities for fixing the gas generator, labeled 11, 11' and 11", are indicated in FIG. 1.

Figure 3:
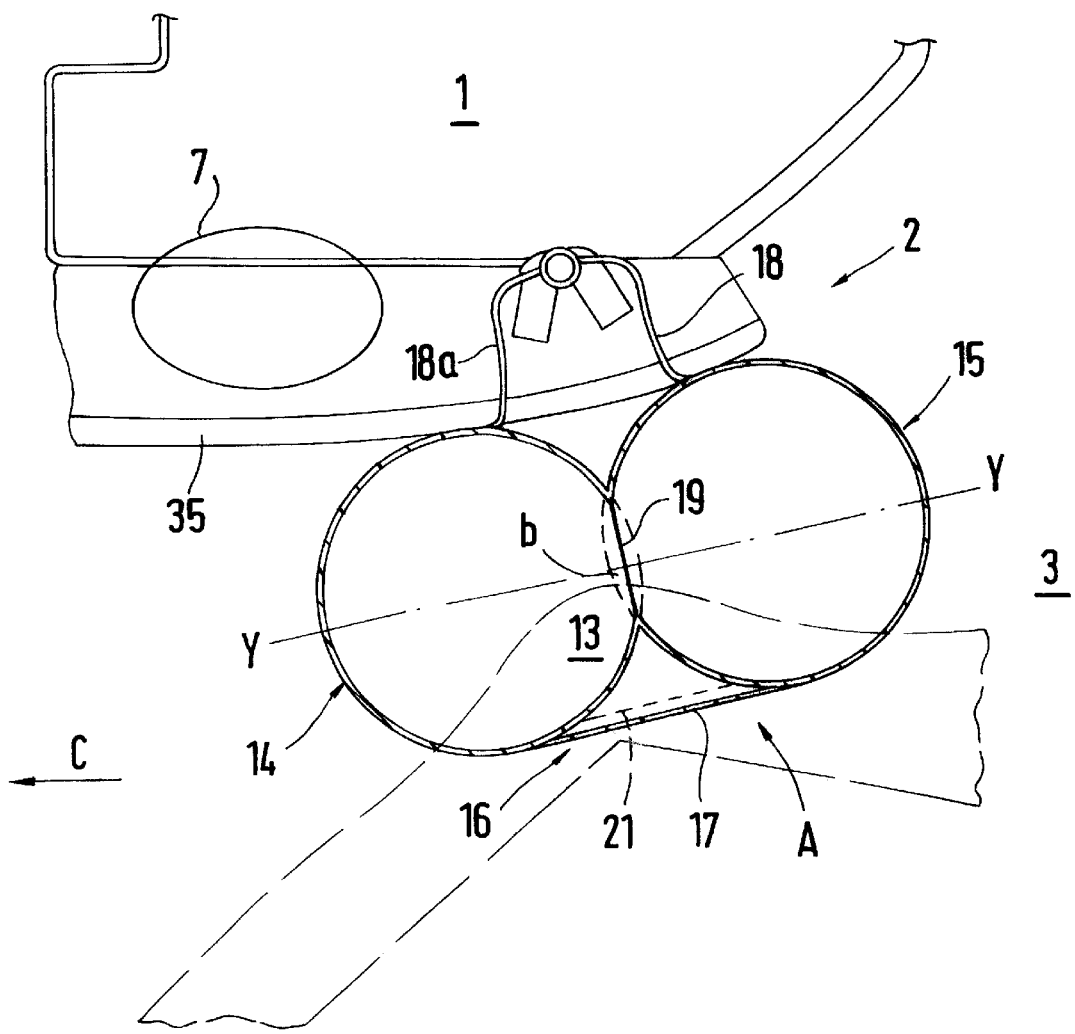
FIG. 3 shows a vertical section in the longitudinal direction of the vehicle through the knee-protection device, the airbag extending in the inflated operating position in front of the knees of a vehicle occupant.

The inflated operating position A of the airbags 14, 15 is shown in FIG. 3. The airbags 14, 15 extend in this position A between the dashboard 1 and the knees 13 of a vehicle occupant 3 and, in the restraining case, lie against the knees 13 of a vehicle occupant 3, so that the knees are largely prevented from shifting forward.

Pursuant to the present invention, the airbags 14, 15, in the inflated operating position A, comprise at least two transversely extending airbags which, in the longitudinal direction of the vehicle, are disposed immediately behind one another or adjacent to one another, the adjoining airbags 14, 15, with their side 16 facing the knees 13, being coupled together over a tangentially extending fabric bridge 17. Moreover, on the side averted from the knees 13, the airbags 14, 15 are held in position by the clearly provided fixing shackles 18, 18a.

The two airbags 14, 15 have an approximately circular cross-section, are approximately equal in size, and are closed off at the two outer ends. In the operating position A, the transversely extending airbags 14, 15 are aligned approximately horizontally. The airbag 14 which in the driving direction C lies further toward the front, lies with its lower edge somewhat further down than does the airbag 15, which is further toward the rear.

The airbags 14, 15 can also be constructed as a so-called air cushion, which has several chambers, which can be filled individually or jointly. The cushion may have tubes, which lie adjacent to one another and have depressions to one another. Moreover, a slight structural overlapping 19 (fixing zone) of the two airbags 14, 15 is provided in the longitudinal direction of the vehicle, that is, the two airbags 14, 15 overlap in the center theoretically only by a dimension b (see FIG. 3).

When there is an increase in pressure in the two airbags 14, 15, they support one another and, due to the structural overlapping 19 of the two airbags 14, 15 in the center, they endeavor to move apart from one another. This is prevented, on the one hand, by the fabric bridge 17 and, on the other, by the fixing shackles 18, 18a. With the design of the fabric bridge 17 and the fixing shackles 18, 18a, a positionally stable airbag system is formed, for which the airbags 14, 15 are braced by the housing, the knee-protection device 2 and the dashboard 1. The airbags 14, 15, as well as the fabric bridge 17, are produced, for example, in a so-called 3-D weaving process, as a result of which additional seams are not required.

Figure 4:
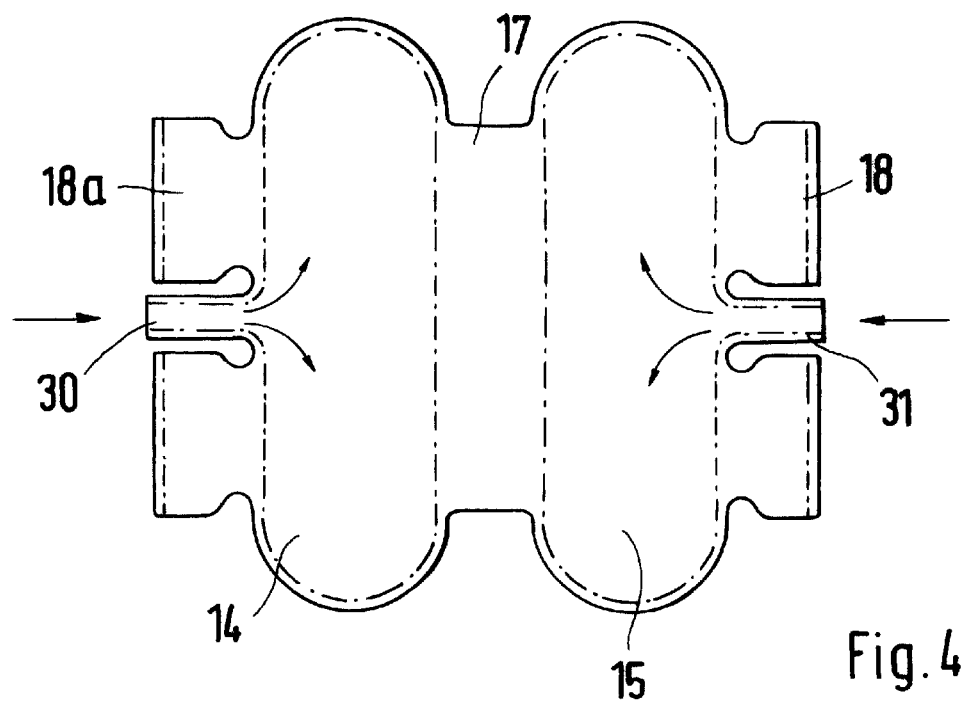
FIG. 4 shows a plan view of the airbags of a first embodiment with two filling openings.
Figure 5:
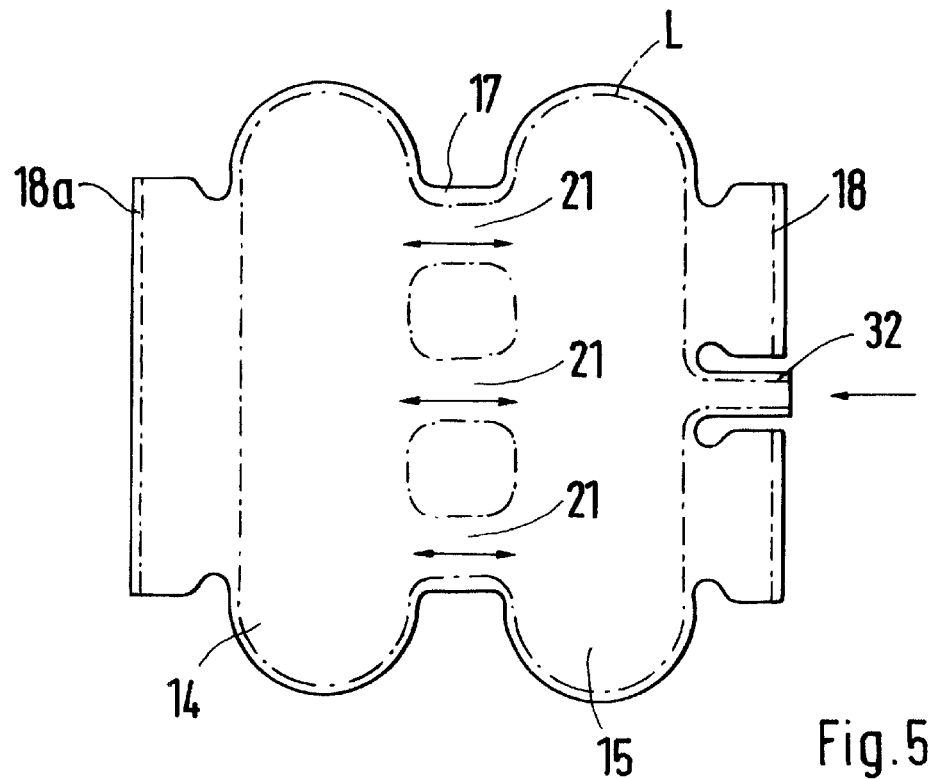
FIG. 5 shows a plan view of the airbags of a second embodiment with one filling opening.

In FIG. 4, the two airbags 14, 15 are shown in greater detail. They are filled over separate openings 30, 31. In FIG. 5, a second embodiment of the airbags 14, 15 is shown, which are connected to one another by one or more overflow channels 21. For this variation, the airbag 15 is filled through the opening 32 and the overflow channels 21 connect the two airbags 14, 15 to one another for the filling process.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A knee-protection device for occupants of a motor vehicle with an airbag which, in an inflated operating position, extends in front of the knees of vehicle occupants, wherein, in the operating position, the knee-protection device consists of at least two airbags which extend transversely to the vehicle and are disposed one directly behind the other in a longitudinal direction of the vehicle and, at least on a side facing the knees, are connected to one another over at least a flexible bridge and on a side of the airbags, averted from the knees, is held in a stationary position at a body of the vehicle by fixing shackles, and wherein the two airbags are aligned in the operating position in a common plane Y—Y.

2. The knee-protection device of claim 1, wherein the airbags lie directly against one another in the operating position and a flattened fixing zone is formed between the airbags.

3. The knee-protection device of claim 1, wherein the two airbags have approximately a same cross section and a same size.

4. The knee-protection device of claim 1, wherein the two airbags and the bridge are produced in one piece in a 3-D weaving process.

5. The knee-protection device of claim 1, wherein the airbags are filled individually over an opening and each airbag is separated by the bridge and forms an independently acting airbag.

6. The knee-protection device of claim 1, wherein the airbags are connected with one another over at least one channel and at least one of the airbags has an opening for filling the airbags.

7. The knee-protection device of claim 1, wherein the knee-protection device is formed as a prefabricated module, which comprises a housing, the at least two airbags which are folded together, and at least one gas generator, the module rigidly connected on an interposed sheet-metal holding plate with a cross beam of a dashboard.

8. The knee-protection device of claim 1 wherein the airbags are circular in cross section and have an elongated, tubular form.

9. The knee-protection device of claim 1 wherein the airbags are elliptical.

10. The knee-protection device of claim 4 wherein the tubular airbags have different diameters.

11. The knee-protection device of claim 1 wherein the bridge extends over a whole length of the airbags and is disposed tangentially to the airbags.

12. The knee-protection device of claim 1 wherein the two airbags are supported in an upright direction at a vehicle body and the flexible bridge is disposed between the airbags at least partially above the knee.

13. A knee-protection device for occupants of a vehicle with at least two airbags which are disposed one directly behind the other in a longitudinal direction of the vehicle, which, in an inflated operating position, extend in front of the knees of a vehicle occupant and are aligned in the operating position in a common plane Y—Y, wherein the two airbags are formed as at least one air cushion, which has a flat supporting surface directed to the knees, and wherein the two airbags are held in a stationary position at a body of the vehicle by fixing shackles.

14. The knee-protection device of claim 13, wherein the at least one air cushion comprises several tubes which are disposed adjacent to one another, extend transversely to the vehicle and are connected with one another.

15. The knee-protection device of claim 13 wherein the at least one air cushion, in a starting position, is folded together in a the body of the vehicle.

16. A vehicle knee-protection device, comprising:

a dashboard including a transverse beam;
a module disposed within the dashboard and including:
  a holding plate connected to the transverse beam;
  a trough-shaped housing connected to the holding plate;
  at least two airbags disposed within the housing;
  an airbag cover disposed over the at least two airbags;
  a gas generator; and
gas-carrying pipes connected to the gas generator and the at least two airbags;
wherein the at least two airbags are disposed one directly behind the other in a longitudinal direction of the vehicle and are held in a stationary position at a body of the vehicle by fixing shackles and wherein the at least two airbags are aligned in an operating position in a common Diane Y—Y.

17. The vehicle knee-protection device of claim 16 wherein the at least two airbags are connected to one another by a flexible bridge.

* * * * *